(12) United States Patent
Park

(10) Patent No.: US 12,387,547 B2
(45) Date of Patent: *Aug. 12, 2025

(54) MACHINE AND METHOD FOR INCREASING INTERACTIONS AND SALES WITH CUSTOMERS

(71) Applicant: Zivin Park, Saipan, MP (US)

(72) Inventor: Zivin Park, Saipan, MP (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,407

(22) Filed: Apr. 21, 2024

(65) Prior Publication Data

US 2025/0078602 A1 Mar. 6, 2025

Related U.S. Application Data

(62) Division of application No. 18/459,048, filed on Aug. 31, 2023, now Pat. No. 12,073,696.

(51) Int. Cl.
  *G07F 9/00* (2006.01)
  *G06F 3/16* (2006.01)
  *G07F 9/02* (2006.01)

(52) U.S. Cl.
  CPC .............. *G07F 9/006* (2013.01); *G06F 3/167* (2013.01); *G07F 9/009* (2020.05); *G07F 9/023* (2013.01)

(58) Field of Classification Search
  CPC .......... G07F 9/006; G07F 9/009; G07F 9/023; G06F 3/167
  See application file for complete search history.

(56) References Cited

U.S. PATENT DOCUMENTS

| | | | | |
|---|---|---|---|---|
| 7,353,080 | B2 * | 4/2008 | Walker | G07F 9/001 700/300 |
| 7,749,089 | B1 * | 7/2010 | Briggs | A63F 13/23 472/136 |
| 7,912,580 | B2 * | 3/2011 | Walker | G07F 9/001 700/240 |
| 9,205,325 | B2 * | 12/2015 | Ramos | A63F 13/61 |
| 9,443,369 | B2 * | 9/2016 | Zito, Jr. | G07F 7/025 |
| 11,587,141 | B2 | 2/2023 | Jafa et al. | |
| 12,073,696 | B1 * | 8/2024 | Park | G07F 9/023 |
| 2005/0187656 | A1 * | 8/2005 | Walker | G06Q 20/40 700/232 |
| 2007/0174121 | A1 * | 7/2007 | Plotkin | G06Q 30/0247 705/14.15 |
| 2012/0122553 | A1 * | 5/2012 | Bunch | G07F 17/3255 463/25 |
| 2014/0073410 | A1 * | 3/2014 | Ramos | G07F 17/3255 463/25 |
| 2020/0364774 | A1 * | 11/2020 | Nagashima | G06Q 20/38215 |
| 2024/0013606 | A1 | 1/2024 | Smee | |

* cited by examiner

*Primary Examiner* — Michael Collins
(74) *Attorney, Agent, or Firm* — Zivin Park

(57) ABSTRACT

An auxiliary unit can be connected to existing automated retail system such as vending machine, kiosks, or automated ticketing machines to increase interactions and sales with customers. The auxiliary unit can have a display unit to show multiple identities and their corresponding scores. The scores can be changed after a transaction between the automated retail system and the customers is complete. The display unit can be a form of a scoreboard and the identities can be either parties in competition or issues worth surveying.

6 Claims, 4 Drawing Sheets

MACHINE AND METHOD FOR INCREASING INTERACTIONS AND SALES WITH CUSTOMERS

CROSS-REFERENCE TO RELATED APPLICATIONS

Divisional of application Ser. No. 18/459,048, filed on Aug. 31, 2023

BACKGROUND OF THE INVENTION

Previous automated sales, such as vending machines at sports events, retail environments, event venues, bars, or restaurants, are not much exciting and do not represent the energy and excitement of events or sports games. Furthermore, the impersonal nature of these automated transactions often leaves customers feeling disconnected from the personalized service and interactions they would normally experience when making purchases in person.

Additionally, customers are usually not inclined to engage in surveys. This is why numerous companies encourage customer participation by providing incentives such as gift cards or the opportunity to win monetary rewards, among other benefits.

This apparatus and method can prove valuable not just in boosting sales and customer engagement, but also in fostering a sense of fan involvement akin to participating in a competition. The advantages of employing this apparatus and method extend to both companies and customers.

SUMMARY OF THE INVENTION

In some embodiments, an auxiliary unit can be connected to existing automated retail system such as vending machines, kiosks, or automated ticketing machines to increase interactions and sales with customers. The auxiliary unit can have a display unit to show multiple identities and their corresponding scores. The scores can be changed after a transaction between the automated retail system and the customers is complete. The display unit can be a form of a scoreboard and the identities can be either parties in competition or issues worth surveying.

In some embodiments, a standalone interactive machine is disclosed for an increased interactions, advertisement and sales with customers. The machine can have a display unit to show multiple names of identities and their corresponding scores. The scores can change after activities are performed by customers. The activities can be commercial activities such as exposure to advertisements, sale of goods, or services to the customers. The identities can be parties in competition or issues worth surveying. The display unit can be a form of a scoreboard.

In some embodiments, customers can be enticed through a method involving display of multiple identity names along with their corresponding scores on a machine. The scores can change after activities are performed by the customers. The identities can be either parties in competition or any issues that are worthy of survey. The display can be a form of a scoreboard.

BRIEF DESCRIPTION OF DRAWINGS

The accompanying figures, which are incorporated herein and form a part of the specification, illustrate the present embodiments and, together with the description, further serve to explain the principles thereof and to enable a person skilled in the related art to make and use the same.

DETAILED DESCRIPTION OF THE INVENTION

The provided descriptions are not restrictive to just one favored embodiment. Instead, they aim to encompass various alternatives, modifications, and equivalents that fall within the essence and extent of the described embodiments, as defined by the claims.

Figure 1:
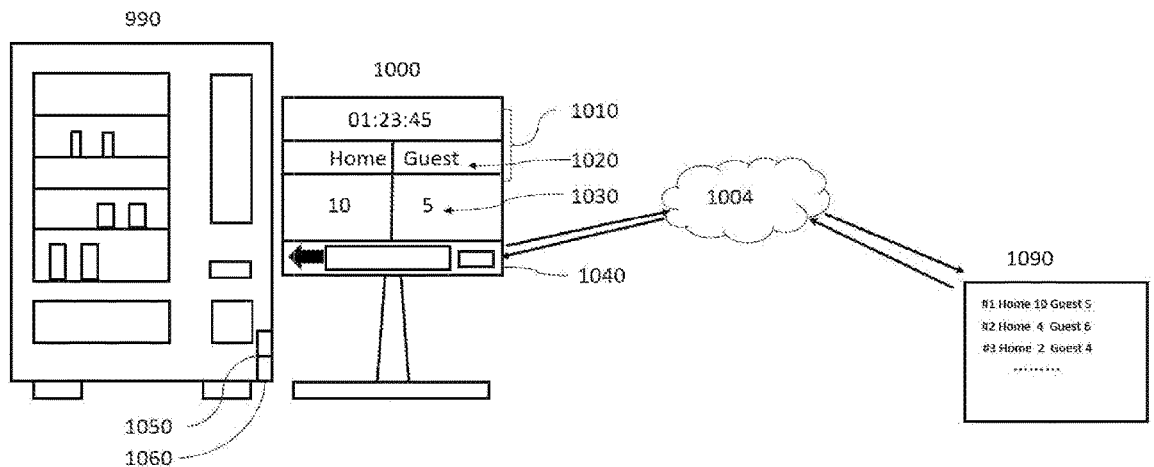
FIG. 1 shows an example of an auxiliary unit next to an existing vending machine, according to an embodiment.

In some embodiments, referring to FIG. 1, an auxiliary unit 1000 can be installed next to existing automated retail systems such as vending machines 990, kiosks, or automated ticketing machines to entice customers and to increase sales with customers. The auxiliary unit can have a display unit 1010 to show multiple identities 1020 and their corresponding scores 1030. The display unit 1010 can be a form of a scoreboard and the identities can be either parties in competition or issues worth surveying. The display unit can display remaining time. The auxiliary unit can have a user interface 1040 to receive input from customers. The user interface can display instructions how to change the score. For example, "Purchase any item from the next vending machine to change the score." In addition, the auxiliary unit has a sensor module 1050 to detect a completion of the transaction at the automated retail system. Once the sensor module detects that transaction is complete, a transmitter module 1060 can transmit a signal of the completion of the transaction to a receiver module which is inside of the auxiliary unit 1000. The signal can be a simple binary signal or can contain transaction information such as purchased product information. When the signal includes payment information, the allowed scores that can be changed can be proportional to the payment amount. The sensor module 1050 and the transmitter module 1060 can be attached to the existing automated retail systems, as shown in FIG. 1. The receiver module can receive the signal from the transmitter module and then activate the user interface to take input from the customers, allowing the customers to select the identities and change the corresponding scores. The user interface can include a touchscreen display for the customers to input into. The display unit consequently displays the scores according to the input. The user interface can include a short-range wireless technology to interact with customers' electronic device, which allows customers to input without physically contacting the user interface.

Figure 2:
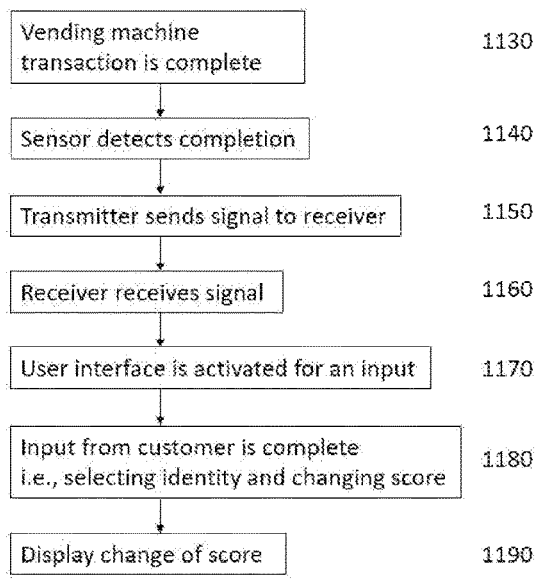
FIG. 2 shows an example of operating an auxiliary unit with an existing vending machine, according to an embodiment.

FIG. 2 summarizes aforementioned sequence. In detail, once a transaction is complete 1130, the sensor detects the completion 1140; subsequently, the transmitter sends a signal to the receiver 1150. The receiver receives signal 1160, and then the user interface is activated for input 1170. Once customer completes the input by selecting the identity and changing the score 1180, the change in score is displayed 1190.

The auxiliary unit can have a GPS unit. In addition, the auxiliary unit can have a communication module for management of the auxiliary unit to send and receive data with a manager via a webserver 1004 as shown in FIG. 1. The communication module is Internet of Things (IoT) capable. The communication module can send data to a webserver 1004 which is hosting a website which allows monitoring the names of identities and the scores displayed on each machines, on a map view or list view on a website 1090 as shown in FIG. 1. The data can include the identities, their corresponding scores of the display unit, and an identification number of the auxiliary unit and GPS information of the auxiliary unit. The auxiliary unit can have a processing unit capable of executing the data, storages and database for storing the data. The auxiliary unit can have a power supply to operate the auxiliary unit independently from the existing automated retail system. Data from a manager can be sent to the communication module, through an application program running on the manager's electronic device connected to an internet. The data from the manager can include names of identities and their initial scores, and remaining time. In addition, the data also can be manually input into the communication module for a management, when Wi-Fi is not available.

Figure 3:
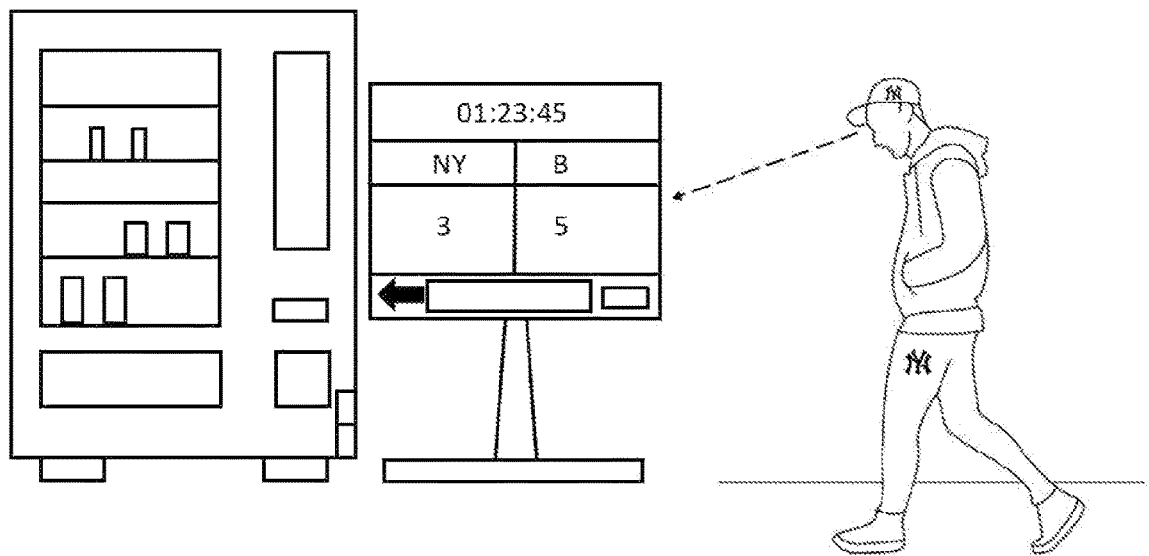
FIG. 3 shows yet another example of operating an auxiliary unit with an existing vending machine, according to an embodiment.
Figure 4:
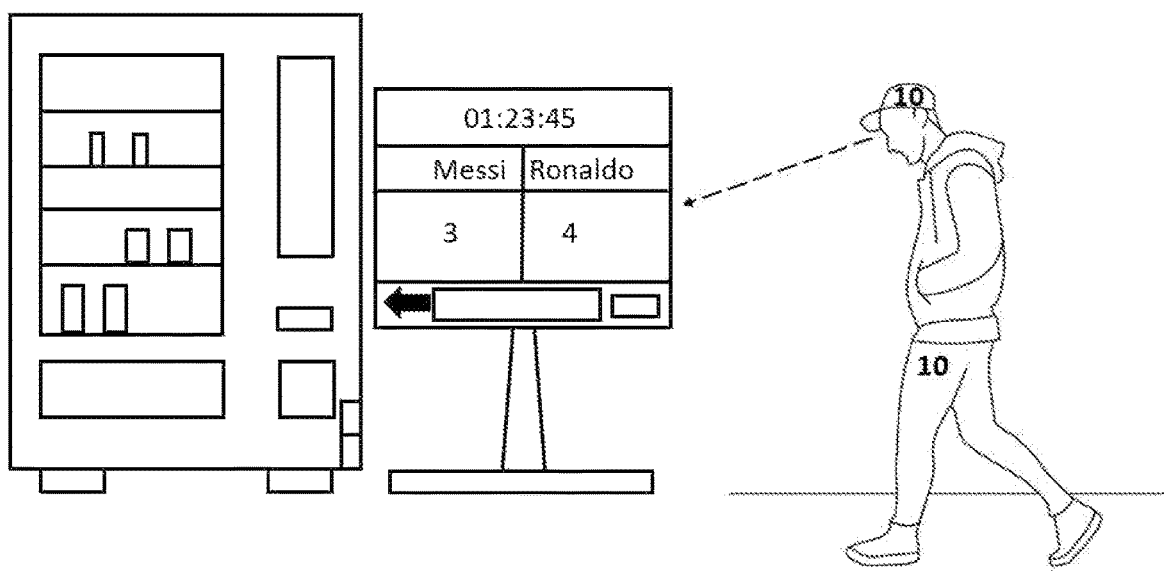
FIG. 4 shows yet another example of operating an auxiliary unit with an existing vending machine, according to an embodiment.

FIG. 3 and FIG. 4 show an example of operating an auxiliary unit with an existing vending machine, according to an embodiment. In detail, the passersby who don't have any intention to buy any product can be enticed to approach and engage in a commercial activity simply to show his support and beliefs by increasing the scores. It might be possible for even a macho man to buy a female hygiene product from a vending machine to increase the score of the identity he supports. Further examples of the identities can include teams in a Super Bowl final from a specific year, the World Cup final of a particular year, and so on. In addition to the sports related examples, the identities and scores can be issues worth surveying such as actual historic events or competing presidential candidates like Trump vs. Biden and so on. However, the identities and scores can be random and can be a fictitious. For example, the identities can be Batman vs. Superman, Star Wars vs. Star Trek, or King Kong vs. Godzilla. Customers can support their favorite identities or teams and make it a winning team by changing the scores, even if that wasn't the case in the actual event, nor was it the consensus of the majority.

The auxiliary unit can be used at a site where real scores of the identities are generated. For example, the site can be a stadium, where a sports game is planned to happen or already happened. The identities displayed can be the teams in a competition. Aside from the auxiliary unit being installed at the site of a competition, the auxiliary unit can be installed and operating in various settings, such as retail environments, event venues, public spaces, bar, or at a restaurant when the competition is happening. The auxiliary unit can be used when real scores of the identities are generated. For example, the auxiliary unit can display names or identities of teams that are in real-time competition. In either cases, in real time or non-real time, the scores on display are not real scores but fictitious scores determined by participating customers after initial scores are setup by management.

Figure 5:
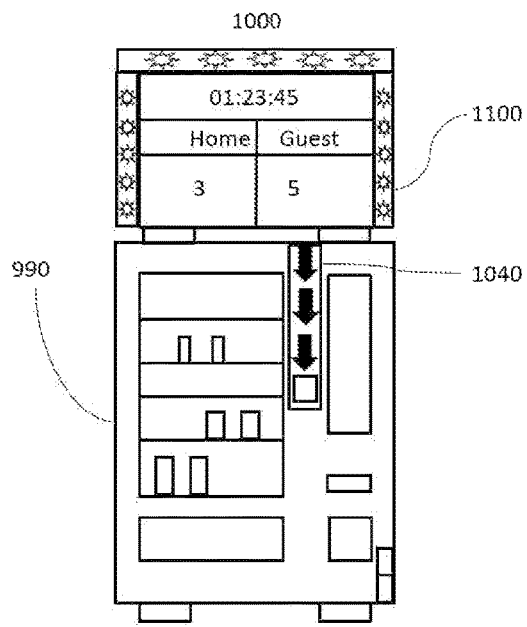
FIG. 5 shows yet another example of operating an auxiliary unit with an existing vending machine, according to an embodiment.

FIG. 5 shows yet another example of operating an auxiliary unit with an existing vending machine, according to an embodiment. The auxiliary unit 1000 can be installed on top of an existing vending machine 990, as opposed to the FIG. 1, where the auxiliary unit is next to an existing vending machine. Also, the auxiliary unit can have a bright, moving LED light 1100 that can further entice attention of passersby. The user interface 1040 can receive input from customers. The aforementioned examples show when the auxiliary unit is connected to vending machines. However, the auxiliary unit can be connected to kiosks or automated ticketing machines in a similar manner.

Figure 6:
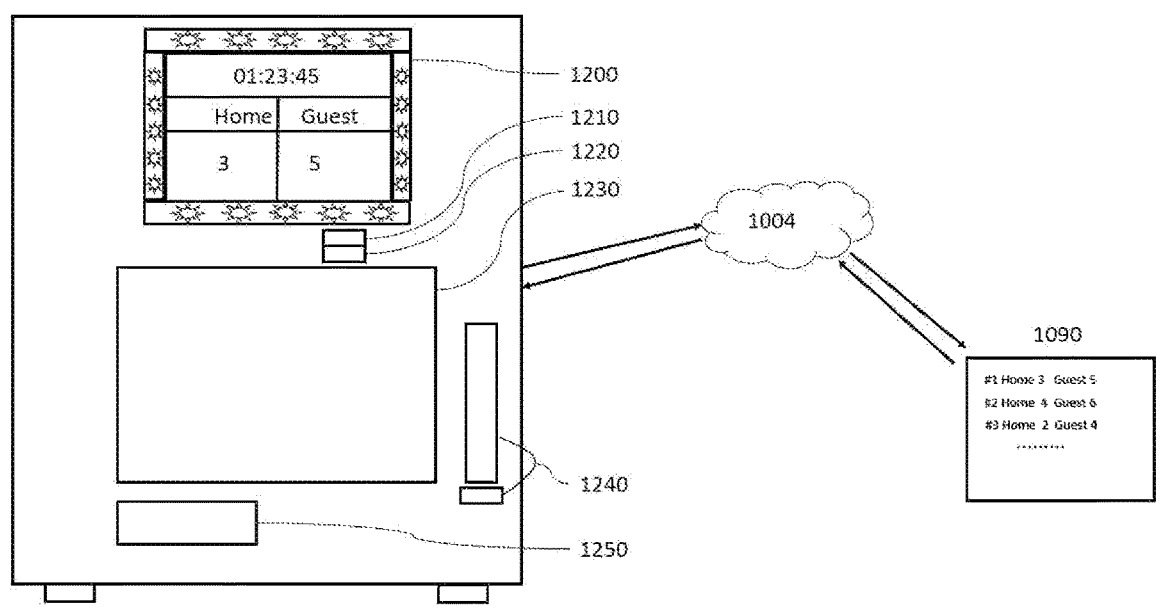
FIG. 6 shows an example of an interactive machine to entice customers, according to an embodiment.

In some embodiments, referring to FIG. 6, an interactive machine to entice customers can have a display unit 1200 to show multiple names of identities and their corresponding scores. The display unit 1200 can be a form of a scoreboard and can display remaining time. The identities can be displayed on the display unit as names but also can be images or logos that represent the identities. The display unit 1200 can have a bright, moving LED light display that can entice attention of passersby. The interactive machine can have a user interface 1230 to receive input from customers. The user interface can include a touchscreen display which allows the customers to input. Also, the user interface can include a short-range wireless technology to interact with customers' electronic device, which allows customers to input without physically contacting the user interface. The interactive machine can have a motion recognition unit 1210 to detect and capture objects including human faces and motions. The user interface 1230 can display image and motion detected by the motion recognition unit. The interactive machine can include an audio system 1220 allowing customers to interact verbally with the machine. The interactive machine can have an integrated payment processing system 1240 that allows customers to make purchases, much like an ordinary vending machine. In addition, customers can make purchases directly through the user interface 1230, in a similar way to using a kiosk at fast food restaurants.

The interactive machine can have a dispensing component 1250 that dispenses products, samples or promotional materials based on activities. The interactive machine can have a GPS unit. In addition, the interactive machine can have a communication module for management of the interactive machine to send and receive data with a manager via a webserver 1004. The communication module is Internet of Things (IoT) capable. The webserver 1004 can host a website 1090 which allows monitoring the names of identities and the scores displayed on each machines, on a map view or list view. The data include, at least the identities, their corresponding scores of the display unit, and an identification number and GPS information of the interactive machine.

The interactive machine can have a processing unit capable of executing the data, storages and database for storing the data and a power supply to operate. Data from a manager can be sent to the communication module, through an application program running on the manager's electronic device connected to an internet. The data from the manager can include, at least names of identities and their initial scores, remaining time, and data related to the identity such as logo, images, clips or sound. The data can also include any other images, clips or sound, such as advertisement for companies. In addition, the data also can be manually input into the communication module for management, when Wi-Fi is not available.

The displayed identities can be either parties in competition or issues worth surveying and the scores can change after activities are performed by customers. Thus, passersby who don't have any intention to buy any product or engage in activities can be enticed to approach and engage in a commercial activity simply to show his support and beliefs by increasing the scores.

The interactive machine can be used at a site where real scores of the identities are generated. For example, the site can be a stadium, where a sports game is planned to happen or already happened. The identities can be the teams in a competition. Aside from the interactive machine being installed at a site of a competition, the interactive machine can be installed and operating in various settings, such as retail environments, event venues, public spaces, bar, or at a restaurant when the competition is happening. The interactive machine can be used when real scores of the identities are generated. For example, the interactive machine can display names or identities of teams that are in real-time competition. In either cases, in real time or non-real time, the scores on display are not real scores generated by the identities but fictitious scores determined by participating customers after initial scores are setup by management.

The activities to change the scores can be associated with commercial activities such as exposure to advertisements, sale of goods, or services to the customers.

Figure 7:
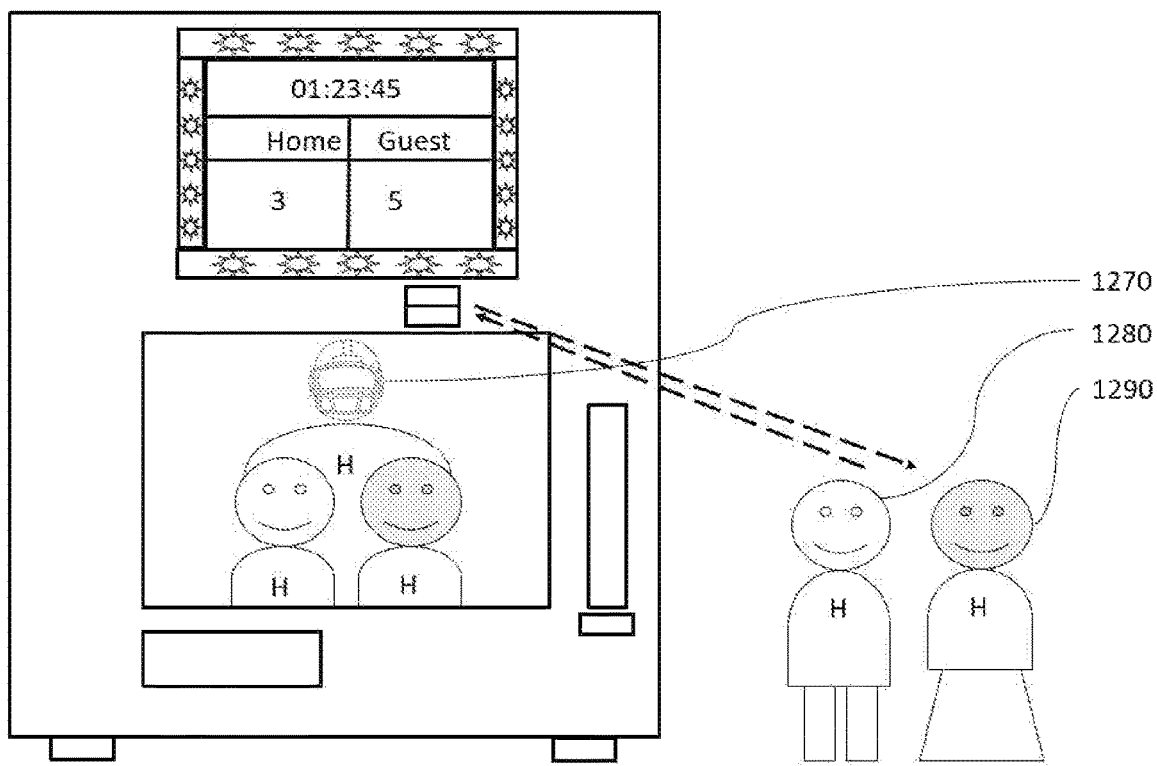
FIG. 7 shows an example of operating an interactive machine to entice customers, according to an embodiment.

One of the services can be a photo booth service, utilizing a motion recognition unit for capturing photos and a user interface for displaying the photos. The scores can change proportional to a number of people shown on the photo. In addition, the photo booth can show an image of members of the team or identities in competition in the background so that the photos can show customers and the members together. Customers can share the photos on social media through the user interface. FIG. 7 shows an example of the photo booth service. In detail, the user interface can display customers 1280 & 1290 with members 1270 of the identities.

In addition to a photo booth service, FIG. 7 also shows yet another example of operating an interactive machine to entice customers, according to an embodiment. In detail, the user interface can entice customers 1280 & 1290 by displaying the customers with members 1270 of the identities when the customers' supporting identities are recognized. The user interface can also entice customers by displaying the customers with any images or logos that represents the identities when the customers' supporting identities are recognized. Also, customers can also be enticed by generated sound that is associated with identities when the customers' supporting identities are recognized. However, even if the customers are not recognized as supporters of any specific identities displayed on the interactive machine, customers can still be simply displayed on the user interface with or without anything related to the identity, just to be enticed to engage in the score changing activities.

Another service to the customers can be allowing the customers to play electronic games on the user interface of the interactive machine. The scores can change proportional to a performance of the electronic games played by the customers. The game can include a digital prize wheel that customers can spin to win. Yet another service to the customers can be team trivia quiz, simple math quiz, or common sense quiz. The scores can change proportional to difficulty of the quiz questions or a number of correct answers. Yet another service to the customers can be survey questions. Customers can answer the questions to increase the scores of the identities or team they support. Yet another service to the customers can be measuring customers' dance or singing performance. The motion recognition unit and the audio system can detect and evaluate the customer's performance.

Another form of the commercial activities can be exposing customers to advertisements. The scores can change proportional to a number of customers exposed to the advertisement or the time customers are exposed. The score can also change when customers get quiz's answers right about the advertisement. Consequently customers may want to increase the scores of the identities or team they support by bringing other customers, by being exposed more time to the advertisement or by focusing more on the contents of the advertisement to get the quiz's answers right.

The commercial activities can include sale of goods. The scores of identities that customers support can change in proportion to a number goods sold or a price of goods sold. The goods can be items associated with a team in competition such as a team logo printed goods.

The commercial activities can be simply making a payment to increase the score of customers' supporting team or identities. The scores can change in proportion to an amount of the payment. In addition to allowing the customer to change the scores, the customers can get a free or sample product.

Regarding detail of the operation of the interactive machine, the scores can start from random values set by management. In addition, the scores of the identities can be either increased or decreased by customers. For example, customers who supports opposing team or identity can decrease the opponent team or identity displayed on the display unit by engaging on the activities. In addition, during a customer's interaction with the user interface, a corresponding team related sound, such as phrase, melody, or slogan can be produced. For example, when the identity or the team is Univ. of Florida, "Go Gators" sound can be produced. Passersby can be also enticed to engage with the interactive machine by generated sound associated with identities when the passersby's supporting identities are recognized. The identities can be managed by management. However, in certain circumstances, when the identities are not determined yet, customers can be allowed to input the names of the identities. Customers can interact with the use interface through a mobile application through a short-range wireless technology. A website or an application program can also allow customers to increase the scores after similar activities are complete by the customers using customers' own devices. All of the embodiments of the interactive machine and the auxiliary unit can be implemented to each other.

In some embodiments, a method can be used to operate an interactive machine for enticing customers. The method includes displaying multiple names of identities and their corresponding scores on the interactive machine. The scores can be changed after activities are performed by customers. The activities can be associated with commercial activities such as exposure to advertisements, sale of goods, or services to the customers. The identities can be either parties in competition or any issues that are worthy of survey. The display can be a form of a scoreboard. The display can include remaining time. The method can be implemented at a site where real scores of the identities are generated. The method can be used when real scores of the identities are generated.

Customers can be further enticed by displaying the customers with anything that represents the identities such as members or images representing the identity when the customers' supporting identities are recognized. However, even if the customers are not recognized as supporters of any specific identities displayed on the interactive machine, customers can still be displayed on the user interface with or without anything related to the identity, just to get engaged in the activities. Customers can be further enticed by generated sound associated with identities when the customers' supporting identities are recognized.

The names of identities and the scores can be modified and monitored by management. The monitoring of the names of identities and the scores can be done through a website displaying a list of the interactive machines in a format of a map view or list view. The modification can be done through means of Internet of Things (IoT) feature of the interactive machine or manually into the interactive machine. The interactive machine can be electronic display board, vending machine, kiosk, advertisement system, or gaming machine.

The invention claimed is:

1. A method of operating an interactive machine for enticing customers, comprising the steps of:

displaying multiple names of sports teams or sports players, of which the customers only support and are not part of, and their corresponding scores in the form of a scoreboard, wherein the scores subsequently change after activities are performed by the customers, wherein the activities are associated with commercial activities including exposure to advertisements, sale of goods, or services to the customers.

2. The method of claim 1, wherein the sports teams or sports players are either in competition or subject to a survey.

3. The method of claim 1, further comprising enticing customers by displaying the customers with sports teams or sports players when the sports teams or sports players which the customers support are recognized.

4. The method of claim 1, wherein the method is implemented at a site where real scores of the sports teams or sports players are generated.

5. The method of claim 1, wherein the method is used when real scores of the sports teams or sports players are generated.

6. The method of claim 1, wherein the interactive machine is an electronic display board, vending machine, kiosks, or automated ticketing machines.

* * * * *